United States Patent
Uchida

(10) Patent No.: US 10,461,971 B2
(45) Date of Patent: Oct. 29, 2019

(54) IC CARD, PORTABLE ELECTRONIC DEVICE, PROGRAM, PROCESSING APPARATUS, AND PROCESSING SYSTEM

(71) Applicants: KABUSHIKI KAISHA TOSHIBA, Minato-ku (JP); Toshiba Infrastructure Systems & Solutions Corporation, Kawasaki-shi (JP)

(72) Inventor: Keisuke Uchida, Yokohama (JP)

(73) Assignees: KABUSHIKI KAISHA TOSHIBA, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 0 days.

(21) Appl. No.: 15/922,234

(22) Filed: Mar. 15, 2018

(65) Prior Publication Data

US 2018/0270089 A1 Sep. 20, 2018

(30) Foreign Application Priority Data

Mar. 17, 2017 (JP) .................... 2017-052683

(51) Int. Cl.
*H04L 25/45* (2006.01)
*H04L 29/06* (2006.01)
(Continued)

(52) U.S. Cl.
CPC .......... *H04L 25/45* (2013.01); *G06F 13/4295* (2013.01); *G06K 7/10019* (2013.01);
(Continued)

(58) Field of Classification Search
CPC ....... H04L 25/45; H04L 1/1819; H04L 29/06; H04B 5/02; G06F 13/4295; G06K 7/10019; G06K 19/0727
(Continued)

(56) References Cited

U.S. PATENT DOCUMENTS 5,768,305 A * 6/1998 Kanda ................ H04B 1/70755
370/479
6,144,972 A * 11/2000 Abe ...................... G06F 16/748
715/205
(Continued)

FOREIGN PATENT DOCUMENTS

| JP | 2008-59271 | 3/2008 |
| JP | 2012-89152 | 5/2012 |
| JP | 2013-125400 | 6/2013 |

OTHER PUBLICATIONS

"Identification cards—Contactless integrated circuit cards—Proximity cards—Part 3: Initialization and anticollision", International Standard, ISO/IEC 14443-3, XP082000010A, 2016, 71 pages.

*Primary Examiner* — James M Perez
(74) *Attorney, Agent, or Firm* — Oblon, McClelland, Maier & Neustadt, L.L.P.

(57) ABSTRACT

According to one embodiment, according to one embodiment, an IC card executing a command from a processing apparatus includes a communication unit and a processing unit. The communication unit transmits/receives data to/from the processing apparatus. Upon receiving, through the communication unit, a first command requesting transmission of data in a first frame not including a start code or an end code, the processing unit transmits data in the first frame through the communication unit.

13 Claims, 6 Drawing Sheets

(51) Int. Cl.
*H04B 5/02* (2006.01)
*G06K 19/07* (2006.01)
*H04L 1/18* (2006.01)
*G06K 7/10* (2006.01)
*G06F 13/42* (2006.01)

(52) U.S. Cl.
CPC ........... *G06K 19/0727* (2013.01); *H04B 5/02* (2013.01); *H04L 1/1819* (2013.01); *H04L 29/06* (2013.01)

(58) Field of Classification Search
USPC .................................. 375/219–223, 259–285
See application file for complete search history.

(56) References Cited

U.S. PATENT DOCUMENTS

| | | | | |
|---|---|---|---|---|
| 6,266,725 | B1* | 7/2001 | Deveaud | G06K 7/0008 710/105 |
| 6,754,200 | B1* | 6/2004 | Nishimura | H04L 1/0002 370/238 |
| 6,873,630 | B1* | 3/2005 | Muller | H04L 29/06 370/356 |
| 7,991,875 | B2* | 8/2011 | Chou | H04L 1/1671 370/229 |
| 9,007,176 | B2* | 4/2015 | Uchida | G06K 7/10059 340/10.1 |
| 9,356,736 | B2* | 5/2016 | Uchida | G06K 7/10237 |
| 9,542,632 | B2* | 1/2017 | Uchida | G06K 7/10237 |
| 10,360,490 | B2* | 7/2019 | Uchida | G06K 19/073 |
| 2002/0083190 | A1* | 6/2002 | Kamiya | H04J 3/1617 709/236 |
| 2002/0086690 | A1* | 7/2002 | Takahashi | H04L 27/2602 455/502 |
| 2002/0114283 | A1* | 8/2002 | Lee | H04L 1/1809 370/252 |
| 2003/0123567 | A1* | 7/2003 | Shigemasa | G06K 7/0008 375/295 |
| 2006/0002429 | A1* | 1/2006 | Doddamane | G06K 7/0008 370/503 |
| 2007/0046268 | A1* | 3/2007 | Irie | H02J 7/0073 323/202 |
| 2007/0140191 | A1* | 6/2007 | Kojima | H04W 76/23 370/338 |
| 2008/0061945 | A1* | 3/2008 | Hoshina | H04B 5/02 340/10.51 |
| 2008/0144650 | A1* | 6/2008 | Boch | G06K 7/0008 370/464 |
| 2009/0101716 | A1* | 4/2009 | Mani | G06K 7/0008 235/441 |
| 2009/0322484 | A1* | 12/2009 | Toriyama | G06K 19/0723 340/10.1 |
| 2010/0240318 | A1* | 9/2010 | Tomoeda | G06K 7/10297 455/68 |
| 2010/0243738 | A1* | 9/2010 | Shimizu | G06K 7/0008 235/439 |
| 2012/0006905 | A1* | 1/2012 | Watanabe | G06K 19/0723 235/492 |
| 2012/0067947 | A1* | 3/2012 | Fukuda | G06K 19/0723 235/380 |
| 2012/0080529 | A1* | 4/2012 | Al-Kadi | G06K 19/07 235/492 |
| 2012/0234926 | A1* | 9/2012 | Nozaki | G06K 19/0723 235/492 |
| 2013/0063253 | A1* | 3/2013 | Rashid | G06K 19/07769 340/10.5 |
| 2014/0084063 | A1* | 3/2014 | Uchida | G06K 7/10237 235/439 |
| 2014/0298133 | A1* | 10/2014 | Hartwich | G06F 13/4295 714/758 |
| 2015/0082111 | A1* | 3/2015 | Uchida | G06K 7/10237 714/748 |
| 2015/0256966 | A1* | 9/2015 | Mori | H04W 4/80 455/41.2 |
| 2016/0071001 | A1* | 3/2016 | Tsuboi | G06K 19/07769 235/440 |
| 2016/0358061 | A1* | 12/2016 | Uchida | G06K 19/07769 |
| 2018/0270089 | A1* | 9/2018 | Uchida | G06F 13/4295 |

* cited by examiner

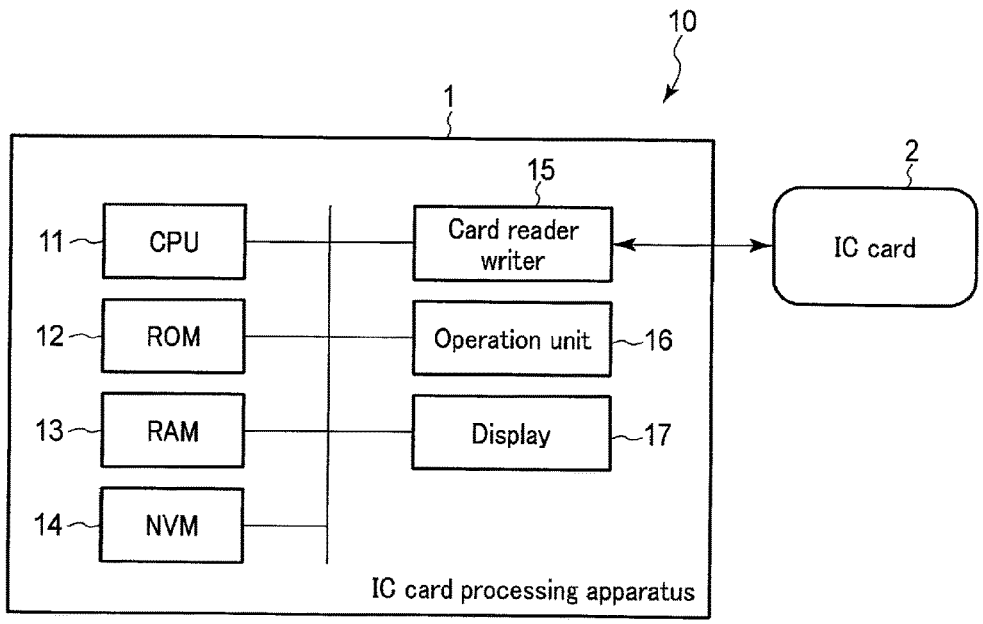
F I G. 1
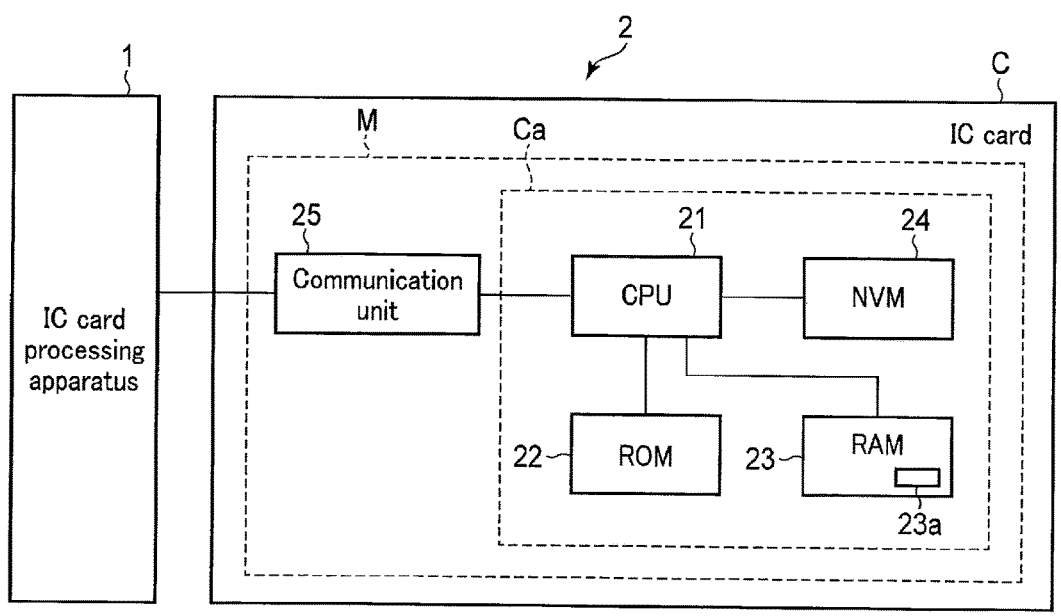
F I G. 2

| SOF | Data block | CRC_B | EOF |

FIG. 3

| Prologue field | | | Information field | Epilogue field |
|---|---|---|---|---|
| PCB | [CID] | [NAD] | [INF] | EDC |
| 1 byte | 1 byte | 1 byte | | 2 bytes |

Error detection code

FSD/FSC

FIG. 4

| b8 | b7 | b6 | b5 | b4 | b3 | b2 | b1 |
|---|---|---|---|---|---|---|---|
| 1 | 0 | 1 | | | 0 | 1 | |

FIG. 5

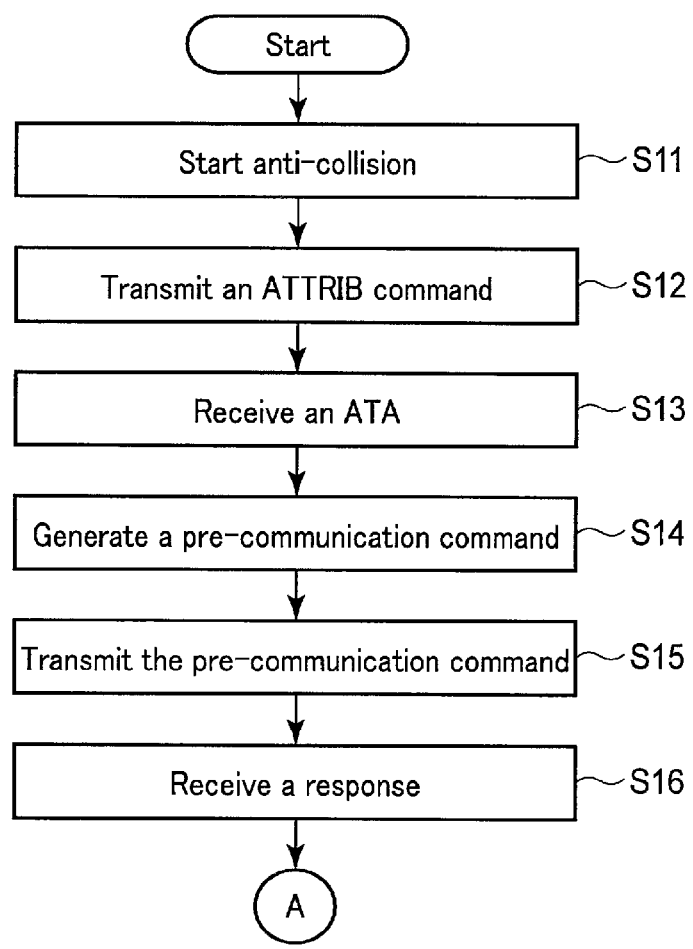
F I G. 6

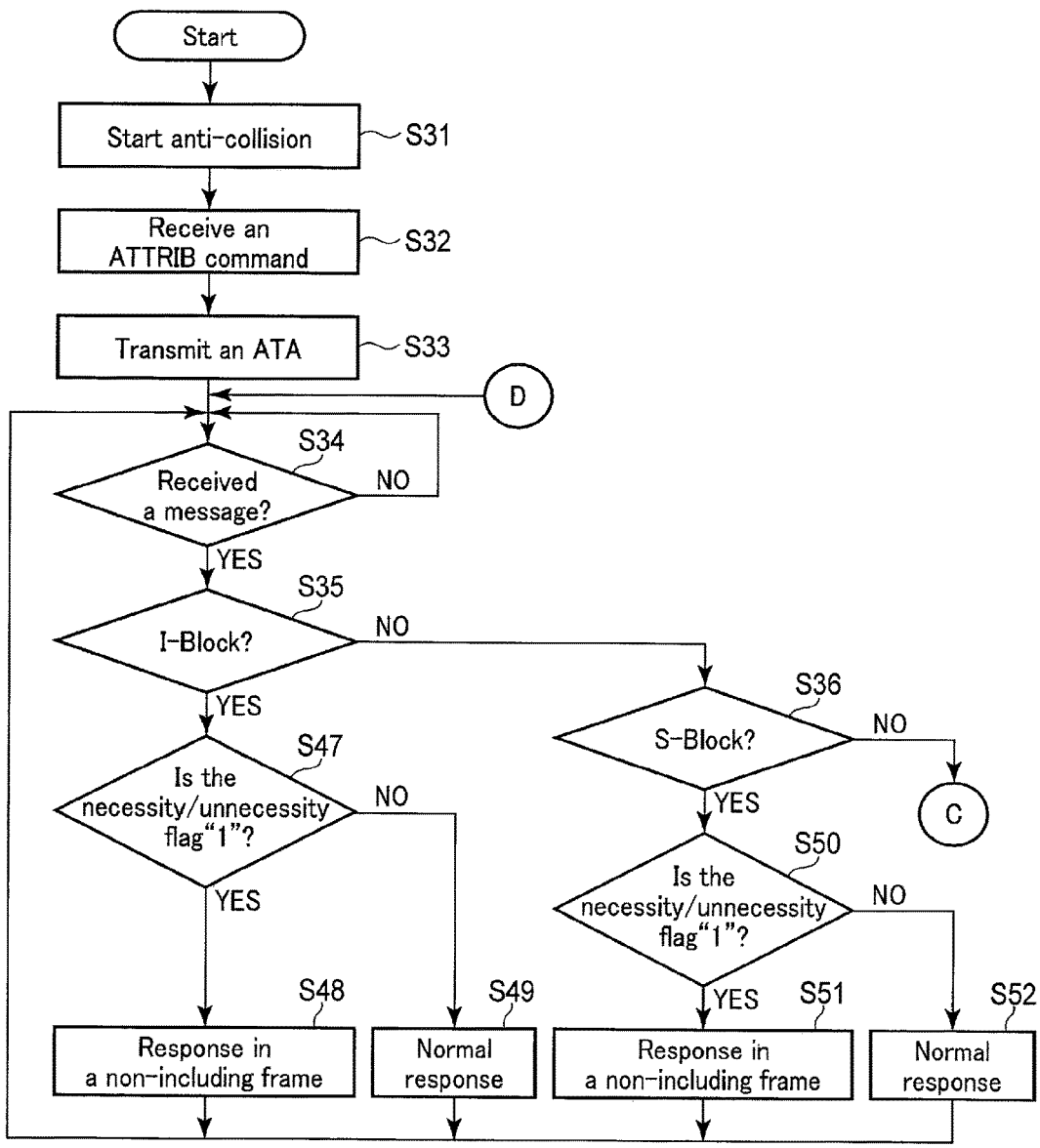
F I G. 8

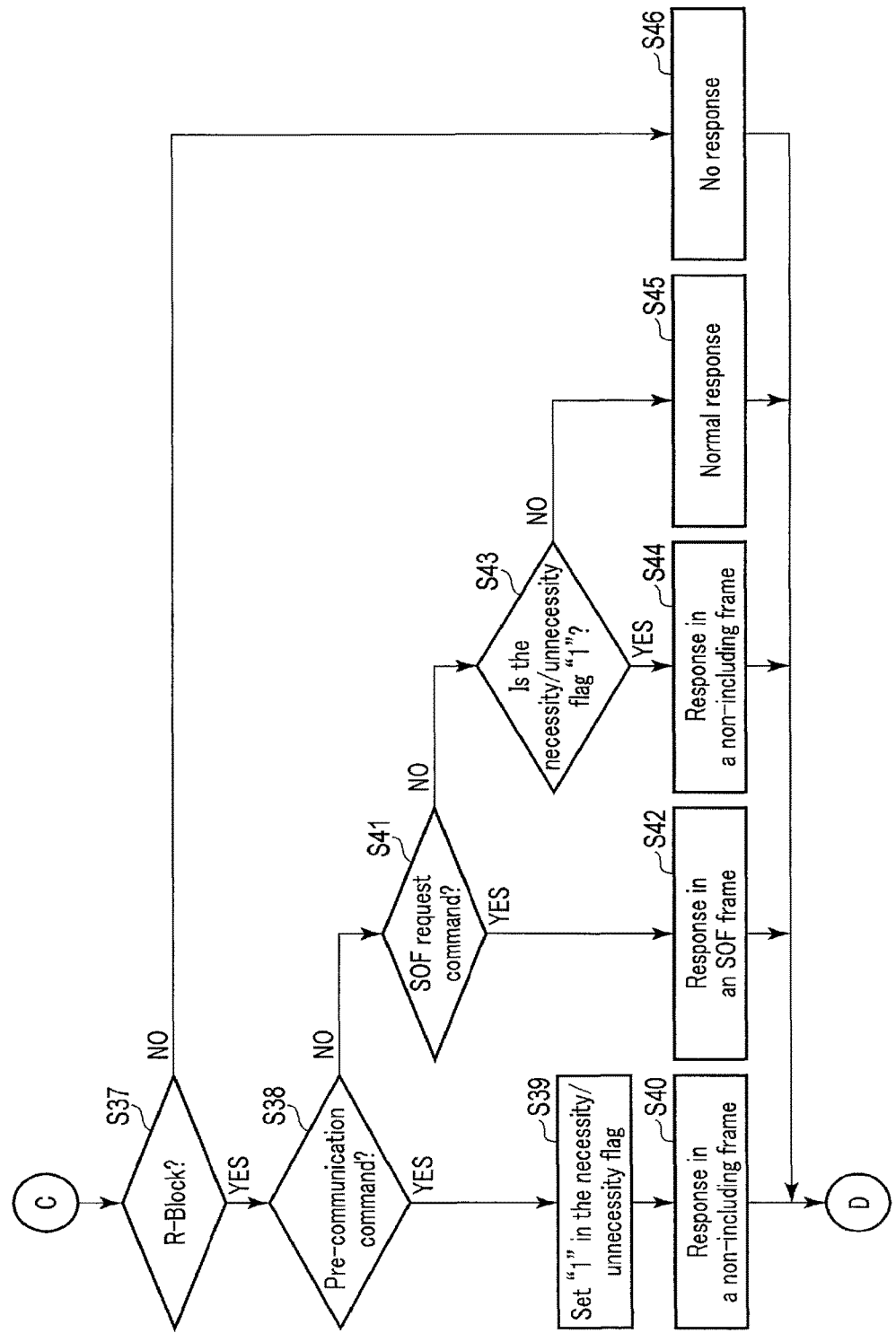
F I G. 9

IC CARD, PORTABLE ELECTRONIC DEVICE, PROGRAM, PROCESSING APPARATUS, AND PROCESSING SYSTEM

CROSS-REFERENCE TO RELATED APPLICATIONS

This application is based upon and claims the benefit of priority from Japanese Patent Application No. 2017-052683, filed Mar. 17, 2017, the entire contents of which are incorporated herein by reference.

FIELD

Embodiments described herein relate generally to an IC card, a portable electronic device, a program, a processing apparatus, and a processing system.

BACKGROUND

Some IC cards communicate with an external device in a non-contact manner. The IC cards send a response according to a command from the external device. Such IC cards sometimes attach an SOF (start of frame) to the beginning of the response and attach an EOF (end of frame) to the end of the response.

Conventionally, IC cards have a drawback that the amount of data that can be sent to an external device decreases by an amount corresponding to the SOF and EOF attached, causing a communication time to increase.

OBJECT OF INVENTION

To solve the above drawback, an IC card, a portable electronic device, a program, a processing apparatus, and a processing system that can reduce a communication time, are provided.

BRIEF DESCRIPTION OF THE DRAWINGS

FIG. 1 is a diagram showing a configuration example of an IC card processing system that includes an IC card and an IC card processing apparatus according to an embodiment.

FIG. 2 is a block diagram showing a configuration example of the IC card according to an embodiment.

FIG. 3 shows an example of a frame format of data that are transmitted/received in the IC card processing system according to an embodiment.

FIG. 4 shows an example of a format of a data block that is transmitted/received in the IC card processing system according to an embodiment.

FIG. 5 shows an example of a PCB format that is transmitted/received in the IC card processing system according to an embodiment.

FIG. 6 is a flowchart showing an operation example of the IC card processing apparatus according to an embodiment.

FIG. 8 is a flowchart showing an operation example of the IC card according to an embodiment.

FIG. 9 is a flowchart showing an operation example of the IC card according to an embodiment.

DETAILED DESCRIPTION

Figure 7:
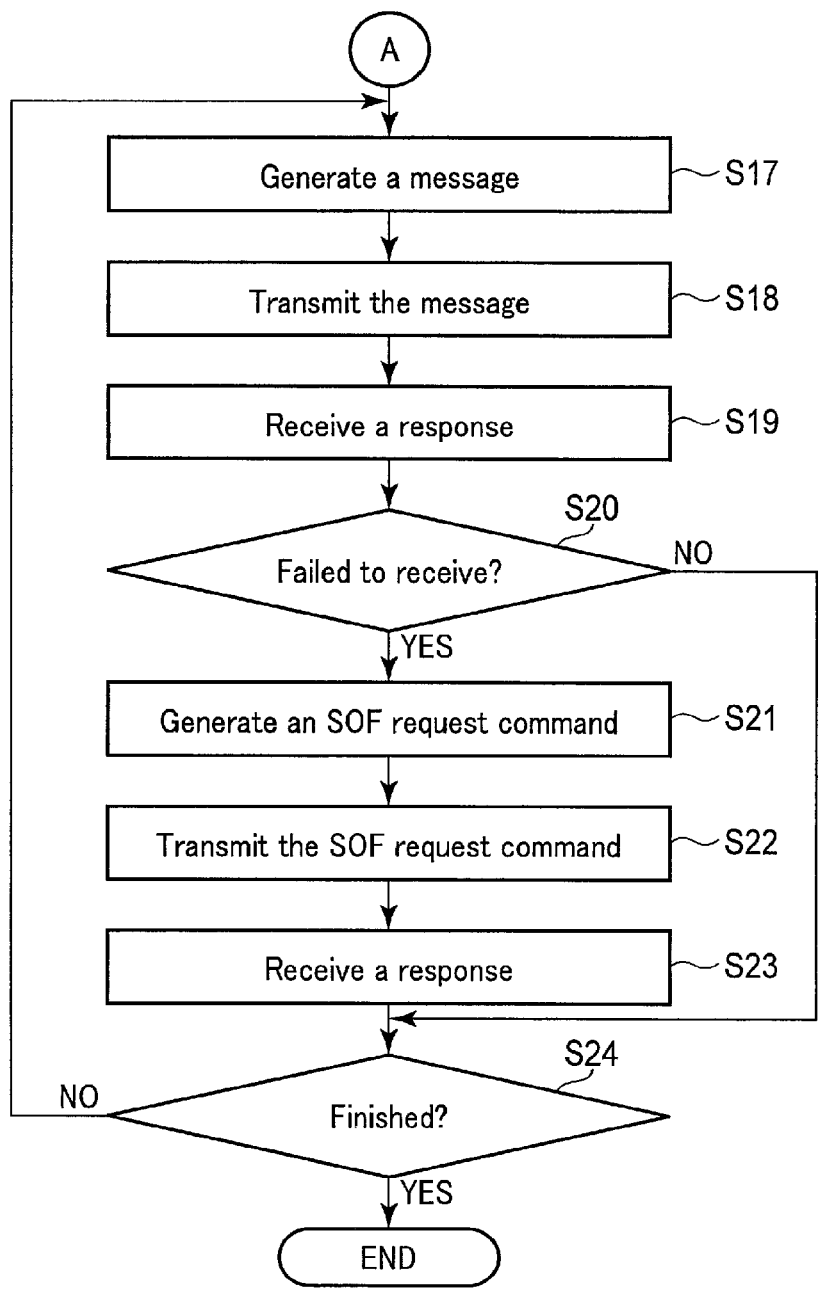
FIG. 7 is a flowchart showing an operation example of the IC card processing apparatus according to an embodiment.

In general, according to one embodiment, an IC card executing a command from a processing apparatus includes a communication unit and a processing unit. The communication unit transmits/receives data to/from the processing apparatus. Upon receiving, through the communication unit, a first command requesting transmission of data in a first frame not including a start code or an end code, the processing unit transmits data in the first frame through the communication unit.

Hereinafter, an embodiment will be described with reference to the accompanying drawings.

FIG. 1 is a block diagram illustrating a configuration example of an IC card processing system 10 according to the embodiment that includes an IC card 2 as a portable electronic device and an IC card processing apparatus 1 as an external apparatus that communicates with the IC card 2.

In the configuration example shown in FIG. 1, the IC card processing apparatus 1 includes a CPU 11, a ROM 12, a RAM 13, an NVM 14, a card reader writer 15, an operation unit 16, a display 17, etc. The CPU 11 is connected with the ROM 12, RAM 13, NVM 14, card reader writer 15, operation unit 16, and display 17 via a data bus. The IC card processing apparatus 1 may include a structure as needed, other than the structure shown in FIG. 1, or may remove a specific structure.

The CPU 11 (processing unit) functions to control the operation of the entire IC card processing apparatus 1. The CPU 11 may include an inner cache, various interfaces, etc. The CPU 11 implements various kinds of processing by executing a program stored in advance in an inner memory, the ROM 12, or the NVM 14. By executing the program, the CPU 11, for example, functions to transmit a command to the IC card 2 through the card reader writer 15, and functions to perform various kinds of processing based on data of a response that is received from the IC card 2, etc. With these functions, the CPU 11, for example, transmits, to the IC card 2 via the card reader writer 15, a write command that includes data input to the operation unit 16, etc., or predetermined data.

The CPU 11 is not limited as long as it is, for example, a processor that controls each element in the IC card processing apparatus 1 and performs information processing by executing the program.

Some of the various functions fulfilled by the CPU 11 by executing the program may be performed by a hardware circuit. In this case, the CPU 11 controls the functions performed by the hardware circuit.

The ROM 12 is a non-volatile memory that stores a control program, control data, etc., in advance. The control program and the control data stored in the ROM 12 are preloaded according to the specification of the IC card processing apparatus 1. For example, the ROM 12 stores a program (e.g., BIOS) that controls a circuit substrate of the IC card processing apparatus 1.

The RAM 13 is a volatile memory. The RAM 13 temporarily stores data, etc., that are being processed by the CPU 11. The RAM 13 stores various application programs based on an instruction from the CPU 11. The RAM 13 may also store, for example, data necessary for executing an application program and a result of executing the application program.

The NVM 14 is a non-volatile memory on which data may be written and rewritten. For example, the NVM 14 is configured by a hard disk, SSD, EEPROM (registered trademark), a flash memory, or the like. The NVM 14 stores a control program, an application, and various data in accordance with the operation purpose of the IC card processing apparatus 1.

The card reader writer 15 (communication unit) is an interface device for transmitting/receiving data to/from the IC card 2 in a non-contact manner. The card reader writer 15 is constituted by an interface conforming to the communication system of the IC card 2.

For example, the card reader writer 15 is constituted by an antenna for performing wireless communication with the IC card 2, and a communication control unit. The card reader writer 15, for example, supplies power to the IC card 2, supplies a clock to the IC card 2, performs reset control of the IC card 2, and transmits/receives data to/from the IC card 2.

With such functions, the card reader writer 15, for example, carries out the following based on the control by the CPU 11: supplies power to the IC card 2; activates the IC card 2; supplies a clock to the IC card 2; performs reset control of the IC card 2; transmits various commands to the IC card 2; and receives from the IC card 2 a response to the commands transmitted.

Various operation instructions are input to the operation unit 16 by an operator of the IC card processing apparatus 1. The operation unit 16 transmits, to the CPU 11, data of an operation instruction input by the operator. The operation unit 16 is a keyboard, numeric key, touch panel, etc.

The display 17 is a display device that displays various pieces of information based on the control of the CPU 11. The display 17 is, for example, a liquid crystal monitor. If the operation unit 16 is configured by a touch panel, the display 17 may be integrally formed with the operation unit 16.

Next, the IC card 2 will be described.

The IC card 2 is activated (becomes operable) by being supplied with power, etc., from an external apparatus, such as the IC card processing apparatus 1. The IC card 2 may perform contact communication or non-contact communication with the IC card processing apparatus 1.

Next, a configuration example of the IC card 2 will be described.

FIG. 2 is a block diagram schematically showing a configuration example of the IC card 2 according to the embodiment.

The IC card 2 includes a card-shaped body C formed of plastic, etc. A module M is embedded in the body C of the IC card 2. The module M is formed as a whole with an IC chip Ca and an external interface as a communication unit (e.g., a communication unit 25) connected with each other, and is embedded in the body C of the IC card 2.

The module M includes the communication unit 25, the IC chip Ca, etc. The IC chip Ca includes a CPU 21, a ROM 22, a RAM 23, an NVM 24, etc. The CPU 21 is connected with the ROM 22, RAM 23, NVM 24, and communication unit 25 via a data bus. The IC card 2 may add a necessary structure as appropriate, or may delete an unnecessary structure.

The CPU 21 (processing unit) functions as a control unit that controls the entire IC card 2. The CPU 21 performs various kinds of processing based on control program and control data stored in the ROM 22 or the NVM 24. For example, the CPU 21 performs various kinds of processing according to the operation control of the IC card 2 or the operation form of the IC card 2 by executing the program stored in the ROM 22.

The CPU 21 is not limited as long as it is, for example, a processor that controls each element in the IC card 2 and performs information processing by executing the program.

Some of the various functions fulfilled by the CPU 21 by executing the program may be performed by a hardware circuit. In this case, the CPU 21 controls the functions performed by the hardware circuit.

The ROM 22 is a non-volatile memory that stores a control program, control data, etc., in advance. The ROM 22 is loaded into the IC card 2 in a manufacturing stage in the state of storing the control program, control data, etc. Namely, the control program and the control data stored in the ROM 22 are preloaded according to the specification of the IC card 2, etc.

The RAM 23 is a volatile memory. The RAM 23 temporarily stores data, etc., that are being processed by the CPU 21. For example, the RAM 23 functions as a calculation buffer, a reception buffer, and a transmission buffer. The calculation buffer temporarily holds, for example, a result of various kinds of computing processing performed by the CPU 21. The reception buffer holds, for example, command data that are received from the IC card processing apparatus 1 via the communication unit 25. The transmission buffer holds, for example, a message (response data) that is transmitted to the IC card processing apparatus 1 via the communication unit 25.

The RAM 23 includes a storage region 23a (storage unit) that stores a necessity/unnecessity flag indicating whether the SOF and the EOF are necessary or not. The necessity/unnecessity flag will be described later.

The NVM 24 is configured by a non-volatile memory on which data may be written and rewritten, such as an EEPROM (registered trademark) or a flash ROM. The NVM 24 stores a control program, an application, and various data in accordance with the operation purpose of the IC card 2. For example, a program file, data file, etc., are created in the NVM 24. The control program, various data, etc., are written into each of the files created.

The communication unit 25 is an interface for transmitting/receiving data to/from the IC card processing apparatus 1 in a non-contact manner. Namely, the communication unit 25 is an interface for communicating with the card reader writer 15 of the IC card processing apparatus 1.

For example, the communication unit 25 is configured by a communication control unit, such as a modulation-demodulation circuit for performing wireless communication with the card reader writer 15 of the IC card processing apparatus 1, and an antenna. For example, the IC card 2 receives radio waves from the IC card processing apparatus 1 via the antenna, the modulation-demodulation circuit, etc. The IC card 2 generates an operation clock and an operation power supply from the radio waves by a power supply unit not shown in the figure, and activates them.

Next, a format of data that are transmitted by the IC card processing apparatus 1 and the IC card 2 to each other will be described.

In this description, the format of the data that are transmitted by the IC card processing apparatus 1 and the IC card 2 to each other follows ISO/IEC14443-3,4.

FIG. 3 is a diagram showing an example of the data format. A frame that conforms to a format (Type B frame format) prescribed by ISO/IEC 14443-3,4 is formed of an SOF, data block, CRC_B, and EOF, as shown in FIG. 3.

The SOF (start code) is a frame start detection code. The SOF is a code indicating a start of the frame. The SOF conforms to ISO/IEC14443. For example, the SOF starts with a falling edge. The SOF continues for 10 ETUs (Elementary Time Unit) at a level of a logical value "0," and rises at the next 1 ETU. Also, the SOF continues "1" for two to three ETUs. The configuration of the SOF is not limited to a specific one.

The data block is a main part of the data that is transmitted. A format of the data block will be described later.

The CRC_B is a cyclic redundancy check code for detecting an error. For example, the CRC_B is used to detect an error of the data block. The CRC_B is a value calculated based on the data of the data block.

The EOF (end code) is a frame end detection code. The EOF is a code indicating an end of the frame. The EOF conforms to ISO/IEC14443. For example, the EOF starts with a falling edge. Also, the EOF continues for 10 ETUs (Elementary Time Unit) at a level of a logical value "0," and rises at the next 1 ETU. The configuration of the EOF is not limited to a specific one.

Next, the format of the data block will be described.

FIG. 4 shows an example of the format of the data block.

FIG. 4 shows a configuration example of the data block that is transmitted/received in the data transmission method prescribed in ISO/IEC14443-4. In the data transmission method prescribed in ISO/IEC14443-4, data in three types of formats, which are I-block (information block), R-block (receive ready block), S-block (supervisory block), are transmitted/received as block transmission.

The I-block, S-block, and R-block respectively have different roles.

The I-block is a format for transmitting information used in an application layer. The I-block is used for normal data reading and writing.

The S-block is a format for exchanging control information between the IC card processing apparatus 1 and the IC card 2. For example, the S-block is used as a request for extending a processing time (WTX: Waiting Time Extension) or an order to deactivate the IC card (Deselect). Whether the S-block is the request for extending a processing time (WTX) or the order to deactivate (Deselect) is specified in a PCB.

The R-block is a format for transmitting a positive acknowledgment or a negative acknowledgment. The R-block includes such kinds as R-block (ACK) and R-block (NAK). The R-block (ACK) is used at a time of requesting the next command. The R-block (NAK) is used at a time of requesting retransmission of the received command.

As shown in FIG. 4, a frame that conforms to the block format prescribed by ISO/IEC14443-4 includes fields such as a prologue field, an information field (INF: Information), and an epilogue field (EDC: Error Detection Code). All of the I-block, R-block, and S-block follow the block format shown in FIG. 4.

The prologue field includes data such as a Protocol Control Byte (PCB), a Card Identifier (CID), and a Node Address (NAD).

The PCB is a protocol control byte. The PCB can transmit, to a device on the other end (external device), information necessary to control data transmission. For example, the PCB includes information indicating whether the frame is in the I-block, R-block, or S-block.

The CID is a card identifier. The CID is data for identifying the IC card to be processed. The IC card 2 stores the CID in the RAM 23 or the NVM 24.

The NAD is a node address. The NAD is data for forming a difference logical connection.

The information field includes data of Information (INF), etc. The INF is, for example, a field storing a data main body of a command, application data, state information, etc. The IC card 2 executes various kinds of processing according to the data stored in the information field. The information field may be omitted. In the R-block, the information field is omitted.

The epilogue field includes data of error detection code (EDC), etc. For example, the EDC stores a redundancy check code, such as a CRC (Cyclic Redundancy Check), in order to detect a data abnormality based on a communication error, etc. The redundancy check code is a value calculated based on the data of the prologue field and the information field.

Next, a format of the PCB will be described.

FIG. 5 shows an example of the format of the PCB.

The PCB is 1-byte data and includes a bit b1 to a bit b8, as shown in FIG. 5.

The bit b8 and the bit b7 indicate a frame format. In this example, the bit b8 and the bit b7 store "1" and "0," respectively.

The bit b6 indicates whether or not to request transmission of a response in a frame that does not include the SOF or the EOF (non-including frame (first frame)). For example, in the case of "0," the bit b6 requests transmission of a response in the non-including frame. In the case of "1," the bit b6 requests transmission of a response in a frame (with the SOF and the EOF) according to ISO/IEC14443-4.

The bit b5 indicates NAK (Negative Acknowledgment) (e.g., "1") or ACK (Acknowledgment) (e.g., "0").

The bit b4 indicates whether or not to involve the CID. For example, in the case of "0," the bit b4 indicates that CID is involved. In the case of "1," the bit b4 indicates that the CID is not involved.

The bit b3 indicates whether or not to request transmission of a response in a frame that includes the SOF (SOF frame (second frame)). Namely, the bit b3 indicates whether or not to request attachment of the SOF to the frame after the bit b6 requests transmission of a response in the non-including frame. For example, in the case of "1," the bit b3 requests transmission of a response in the SOF frame. In the case of "0," the bit b3 requests transmission of a response in the non-including frame.

If the bit b6 does not request transmission of a response in the non-including frame, and if the bit b3 is "0," the bit b3 requests transmission of a response in the frame (with the SOF and the EOF) according to ISO/IEC14443-4.

The bit b2 is a prescribed value "1."

The bit b1 is a block number. The block number indicates a communication phase.

Next, functions fulfilled by the IC card processing apparatus 1 will be described.

First, the CPU 11 of the IC card processing apparatus 1 functions to notify the IC card 2 that use of the non-including frame is permitted in anti-collision.

For example, in anti-collision, the CPU 11 transmits, to the IC card 2 through the card reader writer 15, an ATTRIB command indicating that use of the non-including frame is permitted.

The CPU 11 also functions to transmit, to the IC card 2 through the card reader writer 15, a command requesting transmission of a response in the non-including frame (pre-communication command (first command)).

The pre-communication command is also a command for checking if a response in the non-including frame can be received from the IC card 2.

For example, as the pre-communication command, the CPU 11 generates a command in the R-block in which "1" is set on the bit b6 of the PCB. The CPU 11 transmits the generated command in the R-block to the IC card 2 through the card reader writer 15.

The CPU 11 may generate a command in the I-block or a command in the S-block as the pre-communication command.

The CPU 11 transmits the generated pre-communication command to the IC card 2 through the card reader writer 15.

The CPU 11 also functions to receive a response in the non-including frame from the IC card 2 through the card reader writer 15.

If properly receiving a response in the non-including frame as a response to the pre-communication command, the CPU 11 determines that pre-communication in the non-including frame is successful. Upon determining that communication in the non-including frame is successful, the CPU 11 then receives a response in the non-including frame from the IC card 2 through the card reader writer 15. For example, the CPU 11 receives a response in the non-including frame based on a start bit of the response, an extension buffer time (EGT), or the like. The CPU 11 may transmit a command to the IC card 2 in the non-including frame. The CPU 11 may also transmit a command to the IC card 2 in a normal frame (a frame that includes the SOF and the EOF).

In addition, if failing to receive the response in the non-including frame, the CPU 11 functions to transmit, to the IC card 2, a command requesting transmission of a response in the SOF frame (SOF request command (second command)).

For example, the CPU 11 determines if the CPU 11 has failed to receive the response based on the CRC of the received response, etc. Also, the CPU 11 determines that the CPU 11 has failed to receive the response if the response does not return.

If determining that the CPU 11 has failed to receive the response, the CPU 11 generates, as the SOF request command, a command in the R-block in which "1" is set on the bit b3 of the PCB. For example, the SOF request command is a command to request data similar to the data of the response that the CPU 11 has failed to receive. The CPU 11 transmits the generated command in the R-block to the IC card 2 through the card reader writer 15.

The CPU 11 may generate a command in the I-block or a command in the S-block as the SOF request command.

Upon transmitting the command, the CPU 11 receives a response in the SOF frame from the IC card 2 as a response to the command.

Next, functions fulfilled by the IC card 2 will be described.

First, the CPU 21 of the IC card functions to transmit a response in the non-including frame to the IC card processing apparatus 1 upon receiving a pre-communication command.

Upon receiving a command through the communication unit 25, the CPU 21 determines if the received command is a pre-communication command. In this description, the pre-communication command is a command in the R-block. Upon receiving the command in the R-block, the CPU 21 checks the bit b6 and determines if the received command is the pre-communication command.

If determining that the received command is the pre-communication command, the CPU 21 sets a value (e.g., "1") indicating that the SOF and the EOF are unnecessary in the necessity/unnecessity flag.

The necessity/unnecessity flag indicates whether the SOF and the EOF are necessary or not. Namely, the CPU 21 transmits a response in the non-including frame if "1" is set in the necessity/unnecessity flag. If a value (e.g., "0") indicating that the SOF and the EOF are necessary is set in the necessity/unnecessity flag, the CPU 21 transmits a response in the normal frame (frame with the SOF and the EOF).

The CPU 21 transmits a response in the non-including frame to the IC card processing apparatus 1 as a response to the pre-communication command.

The CPU 21 also generates and transmits a response in the non-including frame if is set in the necessity/unnecessity flag. For example, the CPU 21 also transmits a response to a subsequent command in the non-including frame.

The CPU 21 may determine if the received command is the pre-communication command by checking the bit b6 of the command without determining the type of the command.

The CPU 21 also functions to transmit a response in the SOF frame to the IC card processing apparatus 1 upon receiving the SOF request command.

Upon receiving a command through the communication unit 25, the CPU 21 determines if the received command is the SOF request command. In this description, the SOF request command is a command in the R-block. Upon receiving the command in the R-block, the CPU 21 checks the bit b3 and determines if the received command is the SOF request command.

If determining that the received command is the SOF request command, the CPU 21 generates and transmits a response in the SOF frame. The CPU 21 need not attach the EOF to the response. Namely, the SOF frame need not include the EOF. Also, the CPU 21 maintains the necessity/unnecessity flag even if the CPU 21 receives the SOF request command.

The CPU 21 may determine if the received command is the SOF request command by checking the bit b3 of the command without determining the type of the command.

Next, an operation example of the IC card processing apparatus 1 will be described.

FIGS. 6 and 7 are flowcharts illustrating an operation example of the IC card processing apparatus 1. In this example, the card reader writer 15 of the IC card processing apparatus 1 is capable of communicating with the IC card 2.

First, the CPU 11 of the IC card processing apparatus 1 starts anti-collision (S11). Upon starting the anti-collision, the CPU 11 transmits, to the IC card 2 through the card reader writer 15, an ATTRIB command indicating that use of a non-including frame is permitted (S12).

Upon transmitting the ATTRIB command, the CPU 11 receives an answer to ATTRIB (ATA) from the IC card 2 through the card reader writer 15 (S13). Upon receiving the ATA, the CPU 11 generates a pre-communication command (S14).

Upon generating the pre-communication command, the CPU 11 transmits the generated pre-communication command to the IC card 2 through the card reader writer 15 (S15). Upon transmitting the pre-communication command, the CPU 11 receives a response in a non-including frame through the card reader writer 15 (S16).

Upon receiving the response in the non-including frame, the CPU 11 generates a predetermined message (S17). Upon generating the predetermined message, the CPU 11 transmits the generated message to the IC card 2 through the card reader writer 15 (S18).

Upon transmitting the message to the IC card 2, the CPU 11 receives a response in a non-including frame from the IC card 2 through the card reader writer 15 (S19). Upon receiving the response in the non-including frame, the CPU determines if the CPU 11 has failed to receive a response (S20).

If determining that the CPU 11 has failed to receive a response (S20, Yes), the CPU 11 generates an SOF request command (S21). Upon generating the SOF request command, the CPU 11 transmits the generated SOF request command to the IC card 2 through the card reader writer 15 (S22).

Upon transmitting the SOF request command to the IC card 2, the CPU 11 receives a response in an SOF frame through the card reader writer 15 as a response to the SOF request command (S23).

If determining that the CPU 11 has succeeded in receiving a response (S20, No), or if receiving the response in the SOF frame (S23), the CPU 11 determines whether to end the transmission of the message (S24). For example, the CPU 11 determines if predetermined processing on the IC card 2 is completed.

If determining not to end the transmission of the message (S24, No), the CPU 11 returns to S17.

If determining to end the transmission of the message (S24, Yes), the CPU 11 ends the operation.

The CPU 11 may transmit a command to reset a necessity/unnecessity flag to the IC card 2 if failing to receive a response to the pre-communication command.

The CPU 11 may also transmit the SOF request command to the IC card 2 again if failing to receive a response to the SOF request command.

Next, an operation example of the IC card 2 will be described.

FIGS. 8 and 9 are flowcharts illustrating an operation example of the IC card 2. In this example, the IC card 2 is capable of communicating with the card reader writer 15 of the IC card processing apparatus 1.

First, the CPU 21 of the IC card 2 starts anti-collision (S31). Upon starting the anti-collision, the CPU 21 receives, from the IC card processing apparatus 1 through the communication unit 25, an ATTRIB command indicating that use of a non-including frame is permitted (S32).

Upon receiving the ATTRIB, the CPU 21 transmits an ATA to the IC card processing apparatus 1 through the communication unit 25 (S33). Upon transmitting the ATA, the CPU 21 determines if the CPU 21 has received a message from the IC card processing apparatus 1 through the communication unit 25 (S34).

If determining that the CPU 21 has not received a message (S34, No), the CPU 21 returns to S34.

If determining that the CPU 21 has received a message (S34, Yes), the CPU 21 determines if the received message is in an I-block (S35). If determining that the received message is in an I-block (S35, No), the CPU 21 determines if the received message is in an S-block (S36).

If determining that the received message is not an S-block (S36, No), the CPU 21 determines if the received message is in an R-block (S37). If determining that the received message is in an R-block (S37, Yes), the CPU 21 determines if the received message is a pre-communication command (S38).

If determining that the received message is a pre-communication command (S38, Yes), the CPU 21 sets, in a necessity/unnecessity flag, a value ("1" in this example) indicating transmission of a response in a non-including frame (S39).

Upon setting "1" in the necessity/unnecessity flag, the CPU 21 transmits a response in a non-including frame to the IC card processing apparatus 1 through the communication unit 25 (S40).

If determining that the received message is not a pre-communication command (S38, No), the CPU 21 determines if the received message is an SOF request command (S41). If determining that the received message is an SOF request command (S41, Yes), the CPU 21 transmits a response in an SOF frame to the IC card processing apparatus 1 through the communication unit 25 (S42).

If determining that the received message is not an SOF request command (S41, No), the CPU 21 determines if "1" is set in the necessity/unnecessity flag (S43). If determining that "1" is set in the necessity/unnecessity flag (S43, Yes), the CPU 21 transmits a response in a non-including frame to the IC card processing apparatus 1 (S44).

If determining that "1" is not set in the necessity/unnecessity flag (S43, No), the CPU 21 transmits a response in a normal frame to the IC card processing apparatus 1 (S45).

If determining that the received message is not an R-block (S37, No), the CPU 21 makes no response (S46).

If determining that the received message is in an I-block (S35, Yes), the CPU 21 determines if "1" is set in the necessity/unnecessity flag (S47). If determining that "1" is set in the necessity/unnecessity flag (S47, Yes), the CPU 21 transmits a response in a non-including frame to the IC card processing apparatus 1 (S48).

If determining that "1" is not set in the necessity/unnecessity flag (S47, No), the CPU 21 transmits a response in a normal frame to the IC card processing apparatus 1 (S49).

If determining that the received message is in an S-block (S36, Yes), the CPU 21 determines if "1" is set in the necessity/unnecessity flag (S50). If determining that "1" is set in the necessity/unnecessity flag (S50, Yes), the CPU 21 transmits a response in a non-including frame to the IC card processing apparatus 1 (S51).

If determining that "1" is not set in the necessity/unnecessity flag (S50, No), the CPU 21 transmits a response in a normal frame to the IC card processing apparatus 1 (S52).

If transmitting a response in a non-including frame to the IC card processing apparatus 1 (S40), if transmitting a response in an SOF frame to the IC card processing apparatus 1 (S42), or if transmitting a response in a non-including frame to the IC card processing apparatus 1 (S44), the CPU 21 returns to S34.

If transmitting a response in a normal frame to the IC card processing apparatus 1 (S45), if making no response (S46), or if transmitting a response in a non-including frame to the IC card processing apparatus 1 (S48), the CPU 21 returns to S34.

If transmitting a response in a normal frame to the IC card processing apparatus 1 (S49), if transmitting a response in a non-including frame to the IC card processing apparatus 1 (S51), or if transmitting a response in a normal frame to the IC card processing apparatus 1 (S52), the CPU 21 returns to S34.

The CPU 21 may determine if the received message is a pre-communication command even if the received message is in an I-block or an S-block. The CPU 21 may set "1" in the necessity/unnecessity flag if the received message is a pre-communication command in an I-block or an S-block.

The CPU 21 may also determine if the received message is an SOF request command even if the received message is in an I-block or an S-block. The CPU 21 may transmit a response in an SOF frame if the received message is an SOF request command in an I-block or an S-block.

The IC card processing system having the above-described configuration transmits a response from the IC card in a frame that does not include an SOF or an EOF. Therefore, in the state of not including an SOF or an EOF, the IC card processing system can store a large amount of data in a response. As a result, the IC card processing system can reduce a time of communication between the IC card processing apparatus and the IC card.

Also, the IC card processing system causes the IC card to transmit a response in a frame that includes an SOF if the IC card processing apparatus fails to receive a response. Therefore, the IC card processing system can synchronize the communication between the IC card processing apparatus and the IC card based on the SOF. As a result, the IC card processing system can properly transmit/receive a response. Accordingly, the IC card processing system can achieve both reduction of the communication time and stability of the communication.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card that executes a command from a processing apparatus, the IC card comprising:
   an interface that transmits and receives data to and from the processing apparatus;
     a processor that transmits, through the interface, data in a first frame not comprising a start code or an end code upon receiving, through the interface, a first command requesting transmission of data in the first frame; and
   a storage unit that stores a flag indicating whether the start code and the end code are necessary or not;
   wherein the processor:
   sets, in the flag, a value indicating that the start code and the end code are unnecessary upon receiving the first command;
   transmits data in the first frame to the processing apparatus if the value indicating the unnecessity of the start code and the end code is set in the flag; and
   transmits data in a second frame comprising the start code upon receiving a second command requesting the start code through the interface; and
   the second frame does not comprise the end code.

2. The IC card according to claim 1, wherein the first command is in an R-block.

3. The IC card according to claim 1, wherein:
   the start code is an SOF that conforms to ISO/IEC14443; and
   the end code is an EOF that conforms to ISO/IEC14443.

4. An IC card that executes a command from a processing apparatus, the IC card comprising:
   a module comprising: an interface that transmits and receives data to and from the processing apparatus; a processor that transmits, through the interface, data in a first frame not comprising a start code or an end code upon receiving, through the interface, a first command requesting transmission of data in the first frame; and a storage unit that stores a flag indicating whether the start code and the end code are necessary or not; and
   a body incorporating the module;
   wherein the processor:
   sets, in the flag, a value indicating that the start code and the end code are unnecessary upon receiving the first command;
   transmits data in the first frame to the processing apparatus if the value indicating the unnecessity of the start code and the end code is set in the flag; and
   transmits data in a second frame comprising the start code upon receiving a second command requesting the start code through the interface; and
   the second frame does not comprise the end code.

5. A portable electronic device that executes a command from a processing apparatus, the portable electronic device comprising:
   an interface that transmits and receives data to and from the processing apparatus;
   a processor that transmits, through the interface, data in a first frame not comprising a start code or an end code upon receiving, through the interface, a first command requesting transmission of data in the first frame; and
   a storage unit that stores a flag indicating whether the start code and the end code are necessary or not,
   wherein the processor:
   sets, in the flag, a value indicating that the start code and the end code are unnecessary upon receiving the first command;
   transmits data in the first frame to the processing apparatus if the value indicating the unnecessity of the start code and the end code is set in the flag; and
   transmits data in a second frame comprising the start code upon receiving a second command requesting the start code through the interface; and
   the second frame does not comprise the end code.

6. A non-transitory, computer-readable storage medium comprising a program that, when executed by a processor, causes the processor to be configured to:
   receive a first command requesting transmission of data in a first frame not comprising a start code or an end code, through an interface that transmits and receives data to and from a processing apparatus;
   transmit data in the first frame through the interface if receiving the first command;
   set, in a flag, a value indicating that the start code and the end code are unnecessary upon receiving the first command;
   transmit data in the first frame to the processing apparatus if the value indicating the unnecessity of the start code and the end code is set in the flag; and
   transmit data in a second frame comprising the start code upon receiving a second command requesting the start code through the interface;
   wherein the second frame does not comprise the end code.

7. A processing apparatus that transmits a command to a portable electronic device, the processing apparatus comprising:
   an interface that transmits and receives data to and from the portable electronic device; and
   a processor that transmits, through the interface, a first command requesting transmission of data in a first frame not comprising a start code or an end code; and
   wherein the processor:
   receives data in the first frame through the interface; and
   if failing to receive the data, transmits, through the interface, a second command requesting transmission of data in a second frame comprising the start code.

8. The processing apparatus according to claim 7, wherein the second frame does not comprise the end code.

9. The processing apparatus according to claim 7, wherein the first command is in an R-block.

10. The processing apparatus according to claim 7, wherein:

the start code is an SOF that conforms to ISO/IEC14113; and the end code is an EOF that conforms to ISO/IEC14443.

11. A processing system comprising a portable electronic device and a processing apparatus, wherein:

the portable electronic device comprises: a first interface that transmits and receives data to and from the processing apparatus; a first processor that transmits, through the first interface, data in a first frame not comprising a start code or an end code upon receiving, through the first interface, a first command requesting transmission of data in the first frame; and a storage unit that stores a flag indicating whether the start code and the end code are necessary or not;

the first processor:

sets, in the flag, a value indicating that the start code and the end code are unnecessary upon receiving the first command;

transmits data in the first frame to the processing apparatus if the value indicating the unnecessity of the start code and the end code is set in the flag; and transmits data in a second frame comprising the start code upon receiving a second command requesting the start code through the interface; and the second frame does not comprise the end code;

the processing apparatus comprises: a second interface that transmits and receives data to and from the portable electronic device; and a second processor that transmits the first command through the second interface; and the second processor:

receives data in the first frame through the interface; and if failing to receive the data, transmits, through the interface, the second command.

12. The processing apparatus according to claim 8, wherein the first command is in an R-block.

13. The processing apparatus according to claim 8, wherein:

the start code is an SOF that conforms to ISO/IEC14443; and the end code is an EOF that conforms to ISO/IEC14443.

* * * * *